United States Patent Office 3,057,125
Patented Oct. 9, 1962

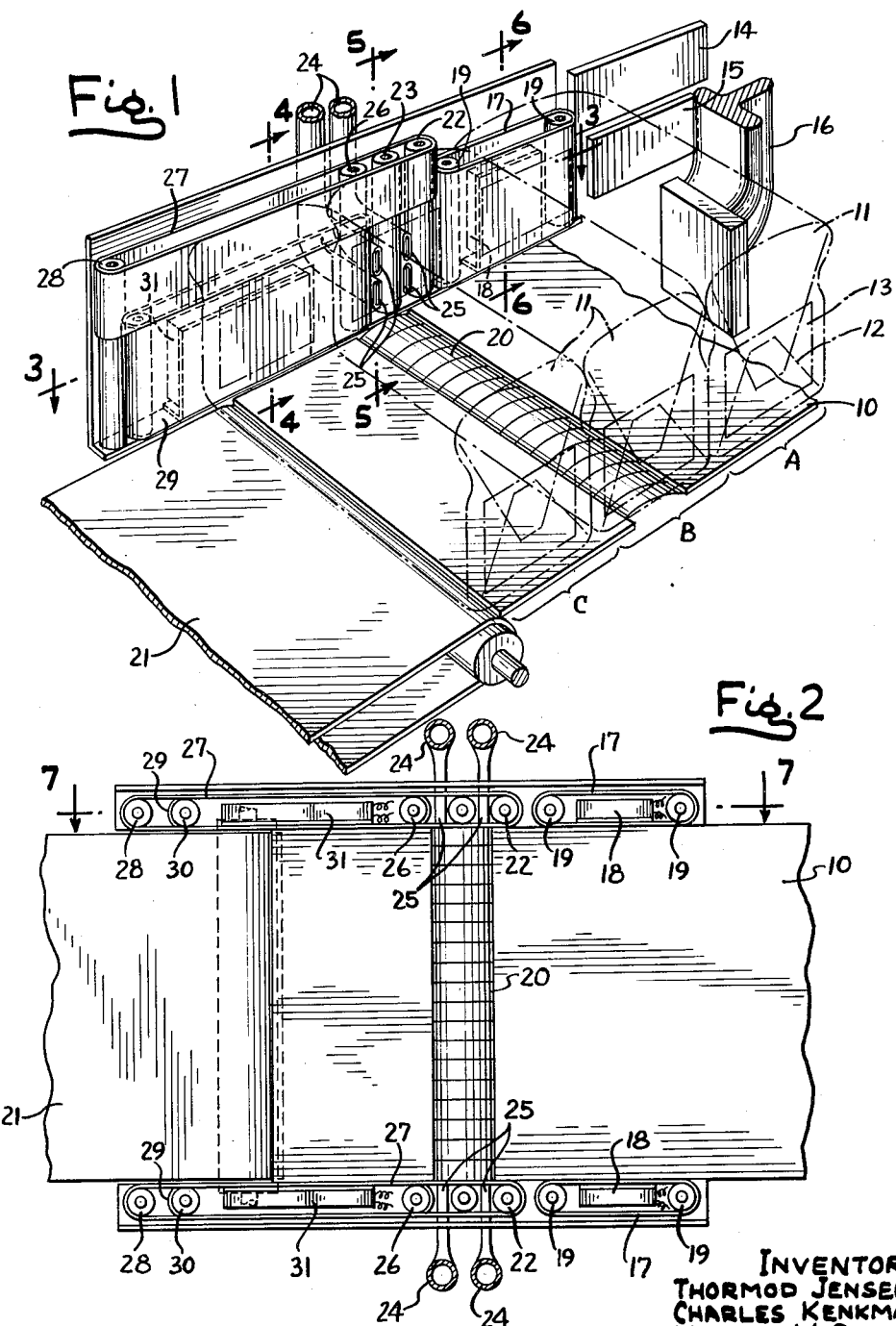

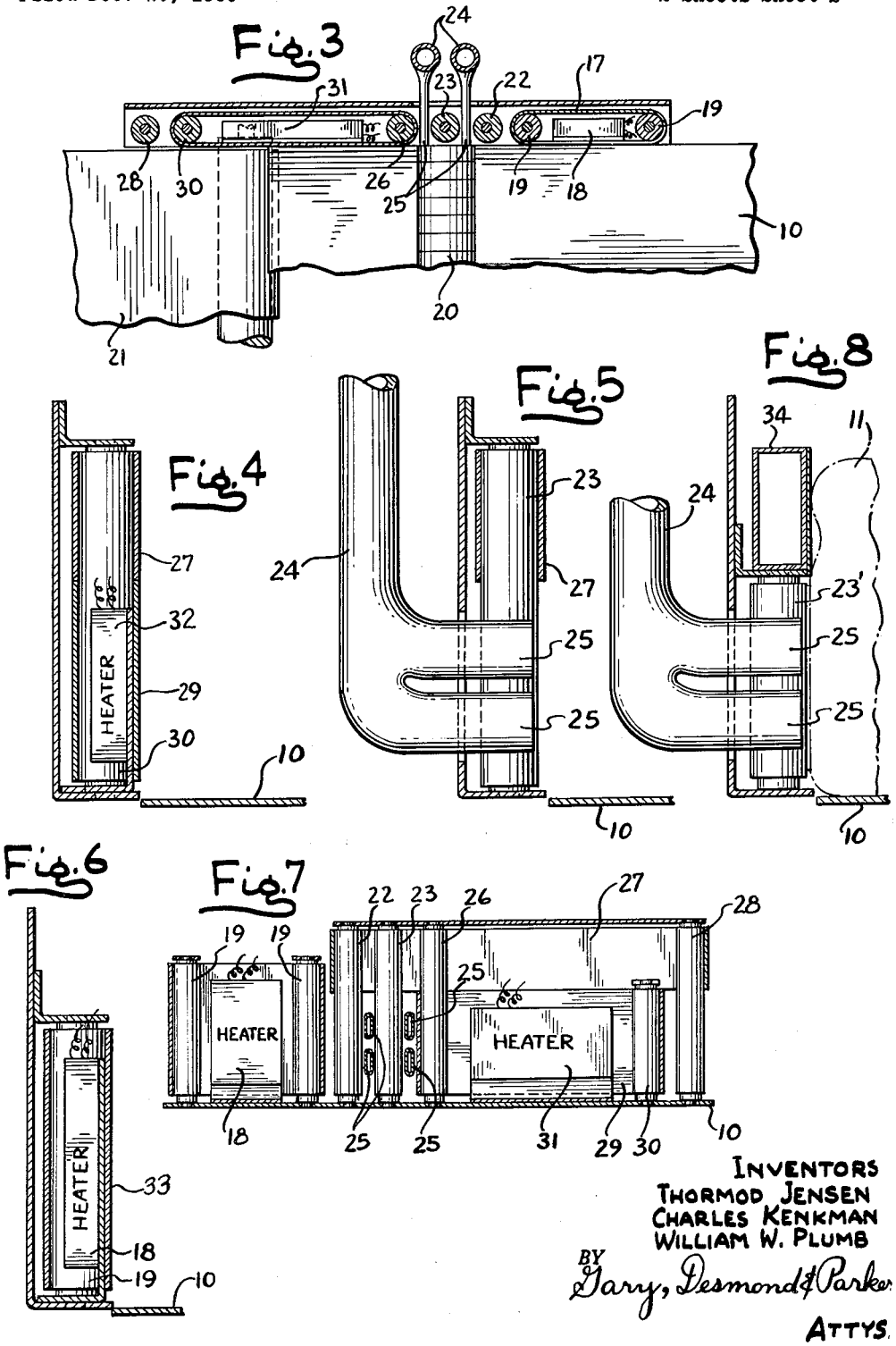

3,057,125
SEALING PROCESS AND APPARATUS
Thormod Jensen, New York, N.Y., and Charles Kenkman and William W. Plumb, Dallas, Tex., assignors to St. Regis Paper Company, New York, N.Y., a corporation of New York
Filed Dec. 29, 1960, Ser. No. 79,377
5 Claims. (Cl. 53—14)

This invention relates to improvements in bread wrapping processes and apparatus, and more specifically to improved means for sealing wrappers about loaves of bread, particularly about the ends thereof and securing of end labels thereover.

The present invention is particularly concerned with the heat sealing of the folded and superimposed projecting end portions of a sheet of thermoplastic film material such as, for example, polyethylene or polypropylene about a loaf of bread during its passage through the folding section of a bread wrapping machine and as it is moved therethrough by top transfer mechanism including pusher arms.

As is well known, the heat sealing of such thermoplastic film materials must be rather closely controlled with respect to temperature and time, inasmuch as such film materials melt rather sharply and deteriorate rapidly, as distinguished from the ability to employ rather wide temperature ranges when heat sealing waxed paper.

As is conventional, imprinted paper end labels are also conventionally adhered by means of a surface coating of thermoplastic adhesive, such as a petroleum wax-stearate composition, over the ends of the bread wrapper, and because of the insulating character of the paper end label the differences in rate of heat transmission between it and the thermoplastic wrapper and their different heat tolerances, the problems of accomplishing a proper or firm seal of the end overfolded layers of the thermoplastic wrapper to each other, and the paper end label thereover, have been further increased.

In this respect, the use of the conventional end fold sealing means comprising a grooved cast iron plate such as is employed with wax paper wrappers has not been found feasible for use in the sealing of the overfolded ends of thermoplastic film to each other and the paper end label thereover.

It is therefore objects of the present invention to provide an improved process and apparatus for securely making such seals in a rapid and economical manner whereby the seals are properly and securely effected without destruction of the thermoplastic film.

The foregoing objects are in general readily accomplished by modifying the conventional bread wrapper end sealing station in a novel manner and by the provision thereat of jets of heated gas as will appear hereinafter.

Other objects of the present invention, its details of construction and arrangement of parts will be apparent from a consideration of the following specification and accompanying drawings, wherein:

FIG. 1 is a fragmentary perspective view of the folding section of a bread wrapping machine; and FIG. 2 is a plan view thereof.

FIG. 3 is a section on the line 3—3 of FIG. 1.

FIG. 4 is a relatively enlarged fragmentary sectional detail view on the line 4—4 of FIG. 1.

FIG. 5 is a relatively enlarged fragmentary sectional detail view on the line 5—5 of FIG. 1.

FIG. 6 is a relatively enlarged fragmentary sectional detail view on the line 6—6 of FIG. 1.

FIG. 7 is a fragmentary detail view on the line 7—7 of FIG. 2.

FIG. 8 is a view similar to that of FIG. 5 but of a modified form.

Referring to the drawings, the reference numeral 10 indicates the bed of the folding section of a bread wrapping machine whereon loaves of bread, such as 11, are moved at the rate of sixty per minute between conventional folding plates and whereby the projecting ends of the bread wrapper are tucked and folded in superimposed relationship as indicated by the dotted lines 12. Printed paper end labels, such as indicated by the dotted lines 13, are passed from a roll, not shown, over knife means generally indicated as 14, severed and then applied against the overfolded ends 12 by the pusher element 15. The latter element may of itself be heated or not, and the thermoplastic bread wrapper ends are mildly preheated prior to the section shown, so that the layer of thermoplastic adhesive carried by the end label 13 will become at least partially tacked to the overfolded ends 12 of the bread wrapper. The assembly is then advanced by means of the pusher arm 16 through a preheat section, designated by the bracketed area A, comprising a pair of opposed endless belts 17, at the opposed sides of the loaf of bread, whereby the wrapped loaf of bread is caused to be moved forwardly under slight end compression, but without abrasion or distortion of the end label, as might be the case were the loaf pushed between rigid surfaces.

Suitably disposed within the run of the belts 17 are electrical heating means 18, such as cartridge heaters or the like, which are regulated to provide a moderate degree of preheating such as below about 200° F., which will commence to activate the theromplastic adhesive carried by the paper end label 13 but is not in itself adequate to bring about complete plasticity of the adhesive on the end label which generally melts at about 275° F. The heat provided by the preheater is clearly not in itself adequate to fuse the overfolded layers 12 of the bread wrapper because of the short time of transit of the loaf of bread between the belts 17 and the insulation effect of the paper end label 13.

A plurality of pusher arms 16, a fragmentary portion of one being shown, as is well understood are pivotally carried overhead on endless chain means not shown, these pusher arms being spaced several loaf widths apart from each other, and positively engage and move the loaves of bread along the bed of the folding machine through the wrapping section thereof, to and between the belts 17 which are rotatably mounted on the rollers 19, 19 and into the area over the heated flexible bottom wrapper overlap sealing fingers 20. At this point the pusher arms 16 become elevated into the upper return run of the overhead chain, leaving the loaf of bread 11 in the sealing section, with movement momentarily arrested for a cycle of approximately one second in this sealing section designated by the bracketed area B and until it is pushed therefrom by an oncoming loaf from area A.

After being in the sealing section B for one second, another loaf of bread coming into preheating section A pushes the loaf from the sealing section B to the afterheating designated by the bracketed area C where it remains for another second prior to discharge onto the moving belt 21 as a result of the movement of another oncoming loaf by means of a successive pusher arm 16.

While the loaf of bread is temporarily arrested in its movement in the sealing section B which is laterally defined by a plurality of rollers such as the rollers 22, 23 and 26, streams of gas heated to a temperature of between about 500–600° are delivered at high velocity through suitable conduit means such as 24, 24 terminating in a plurality of nozzles 25 opening between rollers, as between rollers 22 and 23 and between rollers 23 and 26 in a manner whereby to deliver jets of heated air in a direction substantially normal to the plane of the end labels 13. This heat is adequate to liquefy the adhesive on the label and to cause it to flow into the paper fibers. At the same time heat penetrates through the paper label so as to heat the thermoplastic wrapper to plasticize it at the overfolded portions thereof and to fuse the overfolds into a strong bond to each other and to the end label, the fusing being most pronounced at the zones of the hot air jets to provide a sort of sealing "stitch."

Although polyethylene does soften at about 200° F. and completely disintegrates at about 242° F., the hot air sealing provided in accordance with the present invention is indirect in that it comes through the paper end label. The hot air blast is concentrated in jets within the confines of the label for about one second during the feeding cycle as hereinbefore described, which time period is adequate to effect a strong seal without detriment or disintegration of the thermoplastic wrapper which otherwise cannot withstand such high direct heat.

As will appear from FIG. 1 of the drawings, it will be observed that the end labels 12 are disposed adjacent the bottom of the bread loaf and spaced from the upper portion thereof, as is generally conventional. In order to prevent disintegration of the thermoplastic wrapper by means of deflected streams of hot air issuing from the nozzles 25, shielding means are provided extending substantially parallel to and from and above the upper edge of the end labels 13. As shown in FIG. 1, this shielding means comprises an endless belt 27, trained about the vertical rollers 22 and 23, the deflected streams of heat being thrown inside of the belt and away from contact with the bread wrapper. Further, since the belt moves in frictional contact with the bread loaves, local overheating of the belt is thereby avoided.

In lieu of the shielding belt 27, other shielding means can be substituted, such as for example an elongated Teflon-covered metal tube 34, as shown in FIG. 8, through which cooling air or water is circulated from a suitable source, not shown. In this modification the rollers in the heating section are relatively shortened as indicated at 23'.

As the wrapped loaf is moved from the sealing section B to afterheating section C, it passes between end compression belts 29 trained over rollers 30 and 26 where a temperature of below 200° F. is maintained by heating elements 31 disposed between the runs of the belt. If desired, suitable cartridge heaters may be disposed in the rollers about which the belts are trained, such as the heating element 32 disposed within roller 30 as shown in FIG. 4 or the heating element 33 disposed within the roller 19 as shown in FIG. 6.

At the afterheating section, as the loaf is again endwise compressed between the belts 29 where it is retained for about one second in a mildly heated zone, the outer edge portions of the end labels are pressed into contact with the bread wrapper as an adhesion aid. Here, also, retention between the belts 29 aids in preventing the bread wrapper and particularly the end seals from wrinkling and assures a smooth operation.

The various belts described, other than conveyor belt 21, are not power driven but are driven merely by frictional contact with the loaves of bread as they are pushed along intermittently by the successive pusher arms 16.

The belts 17, 27 and 29, as well as the surfaces of the various vertically disposed rollers, are composed of or surfaced with Teflon-covered fiber-glass material known as Armalon.

It will therefore be obvious that by employing indirect heating means we have been able to securely and conveniently seal the overfolded ends of a thermoplastic bread wrapper, such as polyethylene film which is sensitive to overheating, in a secure and controlled manner while adhesively securing thereover a paper end label.

Although we have shown the preferred embodiments of our invention, various changes in the details thereof may be resorted to without departing from the scope of the appended claims.

We claim:

1. In a method of heat sealing to each other folded superimposed end portions of a sheet of polyethylene film wrapped about a loaf of bread and for adhering a paper end label disposed thereover which comprises moving said loaf under endwise compression and relatively low temperature preheating to a position of temporarily arrested movement, impinging streams of air substantially within the confines of said end label and in a direction substantially normal thereto and at a temperature above the melting point of the polyethylene for a period and at a velocity adapted to fuse said end portions together and to said end label, moving the resultant end-sealed loaf from said arrested position to a second arrested position while endwise compressing it and maintaining it at a relatively lower temperature, and then discharging the product.

2. In a method of heat sealing to each other folded superimposed end portions of a sheet of polyethylene film wrapped about a loaf of bread and for adhering a paper end label disposed thereover adjacent to the bottom and spaced from the top portion of the loaf which comprises moving said loaf under endwise compression and relatively low temperature preheating to a position of temporarily arrested movement, impinging streams of air substantially within the confines of said end label and in a direction substantially normal thereto and at a temperature above the melting point of the polyethylene for a period and at a velocity adapted to fuse said end portions together and to said end label while shielding the upper portion portion of the loaf wrapper extending above the upper edge of said label from deflected destructive air currents, moving the resultant end-sealed loaf from said arrested position to a second arrested position while endwise compressing it and maintaining it at a relatively lower temperature, and then discharging the product.

3. In a bread wrapping machine, a station for heat sealing the folded ends of a thermoplastic film wrapped about a loaf of bread and for sealing thereover a paper end layer surfaced with thermoplastic adhesive, comprising a plurality of vertically disposed rolls mounted for free rotation at the opposed sides of the table of said bread wrapping machine adapted to endwise embrace said loaf of bread, and conduit means disposed between some of said rolls adapted to deliver streams of heated gas against the end labels of a wrapped loaf in a direction substantially normal thereto while disposed in said station.

4. In a bread wrapping machine, a station for heat sealing the folded ends of a thermoplastic film wrapped about a loaf of bread and for sealing thereover a paper end layer surfaced with thermoplastic adhesive, comprising a plurality of vertically disposed rolls mounted for free rotation at the opposed sides of the table of said bread wrapping machine adapted to endwise embrace said loaf of bread, and conduit means disposed between some of said rolls adapted to deliver streams of heated gas against the end labels of a wrapped loaf in a direction substantially normal thereto while disposed in said station, a preheating area comprising an opposed pair of endless belts through which said wrapped endwise folded loaf is passed under compression after the end label is applied, heating means disposed within said belts, and an afterheating area comprising an opposed pair of endless belts to and between which the heat sealed wrapped loaf is moved and temporarily held, and through which it is then discharged, and heating means disposed within the confines of said belts.

5. In a bread wrapping machine, a station for heat sealing the folded ends of a thermoplastic film wrapped about a loaf of bread and for sealing thereover a paper end layer surfaced with thermoplastic adhesive, comprising a plurality of vertically disposed rolls mounted for free rotation at the opposed sides of the table of said bread wrapping machine adapted to endwise embrace said loaf of bread, and conduit means disposed between some of said rolls adapted to deliver streams of heated gas against the end labels of a wrapped loaf in a direction substantially normal thereto while disposed in said station, a preheating area comprising an opposed pair of endless belts through which said wrapped endwise folded loaf is passed under compression after the end label is applied, heating means disposed within said belts, an afterheating area comprising an opposed pair of endless belts to and between which the heat sealed wrapped loaf is moved and temporarily held, and through which it is then discharged, and heating means disposed within the confines of said belts, and means disposed at said heat sealing station substantially parallel to and contiguous with the upper edges of the applied end labels for shielding film material extending thereabove from deflected hot air streams.

References Cited in the file of this patent

UNITED STATES PATENTS 2,228,785  Smith et al. _____ Jan. 14, 1941

FOREIGN PATENTS 114,269  Australia _____ Nov. 19, 1941
714,372  Great Britain _____ Aug. 25, 1954